March 2, 1965  F. J. KURTZ  3,171,205
MEASURING DEVICE
Filed Dec. 31, 1962  2 Sheets-Sheet 1
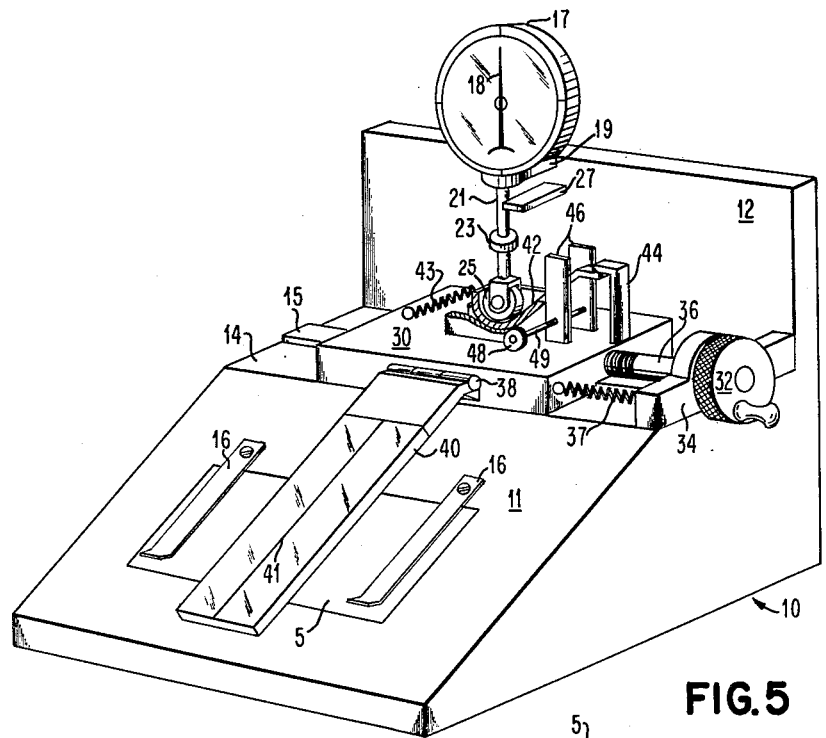
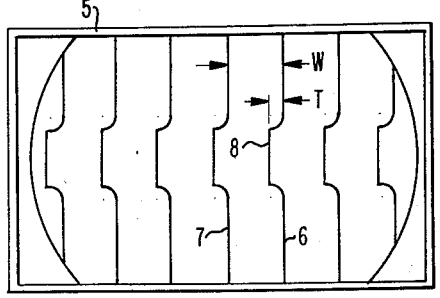
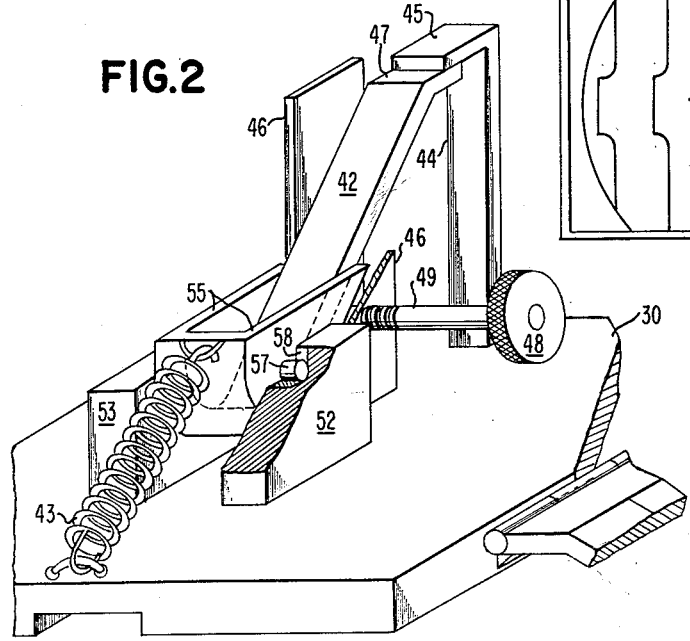
INVENTOR
FRANK J. KURTZ
BY
AGENT March 2, 1965 F. J. KURTZ 3,171,205
MEASURING DEVICE
Filed Dec. 31, 1962 2 Sheets-Sheet 2

United States Patent Office

3,171,205
Patented Mar. 2, 1965

3,171,205
MEASURING DEVICE
Frank J. Kurtz, Esopus, N.Y., assignor to International Business Machines Corporation, New York, N.Y., a corporation of New York
Filed Dec. 31, 1962, Ser. No. 248,603
1 Claim. (Cl. 33—1)

This invention relates to an apparatus for measuring distances and, more particularly, to an apparatus for measuring the distances between fringe lines on an interferometer photograph.

A commonly accepted method of measuring the thickness of a very thin film is to make an interferometer photograph of the edge of such a film. A standard interferometer arrangement employing a microscope equipped with an optical flat, a source of collimated light of substantially uniform frequency and a projection screen is used to create an optical fringe pattern embodying what is effectively a greatly enlarged view of an edge of the thin film deposited on a flat substrate. The actual interferometer photograph, which is made by photographing the optical fringe pattern appearing on the projection screen of the interferometer, consists of a series of parallel fringe lines separated by a distance equal to one half the wave length of the light used in the interferometer. Each fringe line has an off-set or "step" in it. This step is produced by light in the interferometer reflecting from a portion of the edge of the thin film. The degree of offset of one of these steps from its associated "base fringe" is an accurate indication of the thickness of the film under observation.

Heretofore, the calculation of a film thickness by utilizing an interferometer photograph of the type described above has been substantially a manual operation. By the use of a toolmaker's micrometer, the distance between two adjacent base fringes is measured and written down. Next, the distance of an offset fringe from its associated base fringe is measured in the same way and also recorded. The ratio of the latter measurement to the former then is computed, usually by means of a desk calculating machine or a slide rule, and multiplied by the known half-wave length value for the light used in the interferometer. This calculation results in the desired measurement of film thickness.

The drawbacks of this manual computation process are obvious. It is estimated that inaccuracies inherent in the measuring tools used in this operation limit the certainty of the final result to no better than 25 angstrom units on either side of the true thickness. The greatest disadvantage of this system, however, lies in the wide margin for human error which exists. The possibility of writing down a micrometer reading incorrectly, the possibility of reading the micrometer dial incorrectly, the possibility of setting or reading a slide rule or desk calculator incorrectly—all are likely occurrences. This is particularly true when a person works for several uninterrupted hours performing this same analysis on several hundred photographs. Boredom and physical fatigue undoubtedly reduce his efficiency and thus impair the validity of the final data.

It is therefore a principal object of the present invention to provide an apparatus that facilitates the process of determining film thicknesses from interferometer photographs.

It is a further object to provide an apparatus for carrying out such film thickness determinations while requiring a minimum number of discretionary decisions on the part of an operator.

Another object is to eliminate the need for performing numerical calculations in determining film thicknesses from interferometer photographs.

Still another object is to provide an apparatus for semi-automatically carrying out such thickness determinations, the use and operation of which apparatus may be quickly learned by unskilled personnel.

According to the present invention, there is provided a mechanical device employing an adjustable camming surface for measuring selected distances on an interferometer photograph and for converting those measurements directly into a reading of the thickness of the thin film under analysis. Adjustability of the camming surface is provided so that the apparatus is operable upon any interferometer photograph made in an interferometer employing a given frequency of light, no matter what the scale (degree of enlargement) of the photograph happens to be.

The present invention provides thin film measurements within approximately ten angstrom units of true value. The apparatus is relatively compact and easily portable. Because of the simplicity of its principle of operation, the apparatus requires only a few moving parts and thus may be operated for a relatively long period of time without requiring recalibration. Under normal usage, recalibration checks of the instrument are necessary only at thirty day intervals.

The foregoing and other objects, features and advantages of the invention will be apparent from the following more particular description of a preferred embodiment of the invention as illustrated in the accompanying drawings.

In the drawings:

FIG. 1 is a perspective view, partially cut away, illustrating the interrelation of the several elements of one embodiment of the invention.

FIG. 2 is a perspective view of one of the elements of the apparatus shown in FIG. 1.

FIG. 5 is a diagrammatic view of an interferometer photograph of the type which may be analyzed by the invention.

Figure 3A:
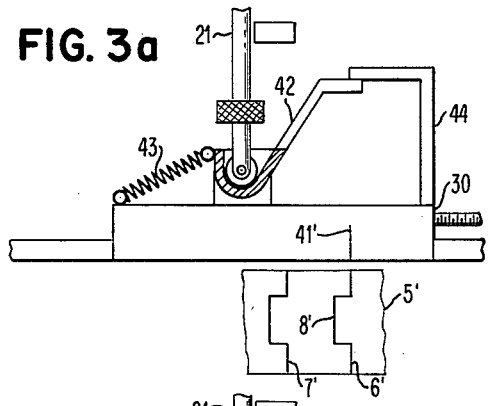
FIGS. 3a–3d are schematic diagrams illustrating the coaction between the principal elements of apparatus of FIG. 1 during four stages of its operation.

Referring now to the drawings, there will be given a detailed description of a preferred embodiment of the invention. As shown in FIG. 1, a frame member 10 has associated with it an inclined support surface 11, a back plate 12 and a horizontal support surface 14. Horizontal surface 14 supports a guide track 15 which guides the movement of a slidable platform 30 as the latter slides on the surface 14. A shaft 36, threadedly connected to platform 30, is rotatably supported parallel to the surface 14 by a journal block 34. A crank-wheel 32 is connected to the outer end of the shaft 36 to allow easy manual manipulation of the slidable platform 30. A tension spring 37 exerts a constant bias force on the platform 30 so that there are no backlash problems when crank-wheel 32 is reversed to reverse the direction of motion of platform 30.

A hinge 38 connects a transparent measuring slide 40 to the platform 30. The measuring slide 40 has a hairline 41 inscribed vertically in its center for purposes to be subsequently disclosed. A pair of spring clips 16 are fastened onto inclined support surface 11 so that an interferometer photograph 5 may be securely positioned beneath the measuring slide 40.

Mounted on the slidable platform 30 is a pivotable camming member 42 which is held at its upper end against a detent member 44 by the bias of a tension spring 43. A pair of clamping plates 46 are mounted on either side of the camming member 42 and may be drawn together to exert a clamping force on the camming member 42 by manual operation of a knob 48 which rotates a threaded shaft 49.

A dial indicator 17 is fixed by means of a bracket 19 to the backplate 12. A plunger 21 extends downwardly from the dial indicator 17 and is vertically movable to actuate, in a well-known manner, the needle 18 of the dial indicator. A stop nut 23 is threadedly adjustable on the plunger 21 and coacts with a stop lug 27 on backplate 12 to limit the upward travel of the plunger 21. An anti-friction roller 25 is provided on the lower end of the plunger so that as the platform 30 is moved to the left the plunger is urged vertically upward by the camming member 42 with lateral binding forces on the plunger being held to a minimum.

The scale on dial indicator 17 is calibrated, by choice, in angstrom units (microns or millimicrons, for example, could be used with equal convenience), and, because the interferometer photographs available during development of the present embodiment were made with a mercury lamp filtered to emit radiation having a wave length of 5460 angstrom units, the scale progresses from zero to 2730. The reason for this scale arrangement will become fully understood after the operation of the present embodiment has been described. Further, the scale is positioned in relation to the needle 18 so that when the plunger 21 is in its lowest position the needle is pointed to zero on the scale. The stop nut 23 is threadedly adjusted on the plunger so that upward travel of the plunger is arrested after the needle 18 has made exactly one revolution. That is to say, the stop nut 23 engages the stop lug 27 when the needle points to 2730 on the scale. The needle is thus restrained from further clockwise movement.

With reference now to FIG. 2, the details of the pivotable camming member 42, the parts related thereto, will be described. A pair of support members 52 and 53 serve to pivotably support camming member 42 on the platform 30. The lower portion of the camming member is J-shaped to cradle the roller 25 of the plunger 21 (see FIG. 1). Spanning the J portion of the camming member are a pair of sidewalls 55. Each of the sidewalls supports an outwardly extending pivot pin 57 (only one of which is shown). Each of these pivot pins, in turn, is supported in a vertical slot 58 (only one of which is shown) in each of the support members 52 and 53.

The upper end of camming member 42 has a horizontally extending arm 47. The tension spring 43, mounted between the platform 30 and the lower end of camming member 42, exerts a constant bias force which creates a counterclockwise moment about the pivot pins 57. As shown in FIG. 2, the arm 47 coacts with the horizontal arm 45 of detent member 44 to maintain the camming member 42 in the position shown. The clamping plates 46 can be drawn toward one another by rotation of threaded shaft 49. This exerts a clamping pressure against the side edges of camming member 42 to maintain that member in a selected downward position against the bias of spring 43. This will subsequently be more fully explained in connection with FIGS. 3a–3d.

FIG. 5 represents a typical interferometer photograph of a thin film evaporated on a flat substrate. As has been previously explained, a series of base fringes such as 6 and 7 extend parallel to one another across the photograph. Each of these fringes is interrupted by an offset fringe 8. The degree of offset T of these fringes is a greatly enlarged representation of the thickness of the thin film. The distance W separating the base fringes on the photograph is representative of the half-wave length of the light used in the interferometer. Since, as was previously mentioned, the specific photographs used with the present embodiment are made in an interferometer employing a mercury light source filtered to emit radiation at substantially a single wave length equal to 5460 angstrom units, the distance W between base fringes on the photograph represents a true distance of 2730 angstrom units. Thus, to obtain a direct measurement of the distance T in angstrom units, it is necessary, as previously explained, to measure the distance W and the distance T as they appear on the photograph, to obtain the value of the ratio $T/W$ and to multiply that value by 2730.

The manner in which the apparatus of the present invention measures these distances and converts them directly into a reading of film thickness will be hereinafter described with reference to FIG. 1, FIGS. 3a–3d and FIGS. 4a–4d. It is to be understood that FIGS. 3a–3d are meant to schematically depict the apparatus of FIG. 1. In FIGS. 3a–3d the photograph 5 is represented at 5', the fringes 6, 7 and 8 are shown at 6', 7' and 8', respectively, and the hairline 41 is represented by a line 41' inscribed on the side of the platform 30. FIGS. 4a–4d relate, respectively, to FIGS. 3a–3d and indicate the position of the needle 18 in respect to the dial scale for each of the four positions of the apparatus represented in FIGS. 3a–3d.

Looking now at FIG. 1, the operator sets the indicator needle 18 to zero by rotating the crank-wheel 32 until the roller 25 is cradled in the J portion of camming member 42. Next, an interferometer photograph 5 is inserted under the clips 16 and positioned so that a base fringe (for example, 6 of FIG. 5) is in alignment with the hairline 41 of the measuring slide 40. The clips 16 serve to secure the photograph onto the surface 11 of the frame 10 in this reference position.

Now referring to FIG. 3a, it can be seen that the apparatus is therein shown in the condition described in the preceding paragraph. The operator rotates crank-wheel 32 to begin moving the platform 30 to the left. The hairline 41' leaves the fringe 6' and begins to move toward the next adjacent base fringe, fringe 7'. Also, the plunger 21 is urged upward by the camming member 42, the force of spring 43 being sufficient to maintain the camming member in its uppermost position.

Figure 3B:
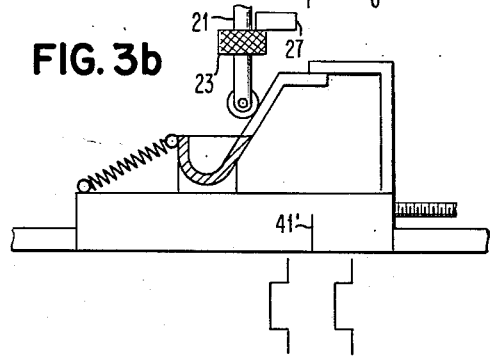

As depicted in FIG. 3b the hairline 41' will be at some point intermediate the fringes 6' and 7' when the upward travel of plunger 21 is arrested by stop nut 23 abutting against stop lug 27. The dial shown in FIG. 4b indicates that the needle 18 is thus halted after making one complete revolution.

As the operator continues to move the hairline 41' toward fringe 7', the camming member 42 is forced to pivot clockwise against the bias of spring 43 since the plunger 21 is now restrained from further upward travel. Camming member 42 will continue to pivot against the bias of spring 43 as long as lateral movement of the platform 30 is continued.

Figure 3C:
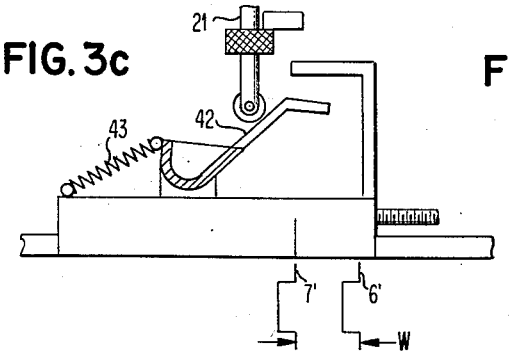
Figure 3D:
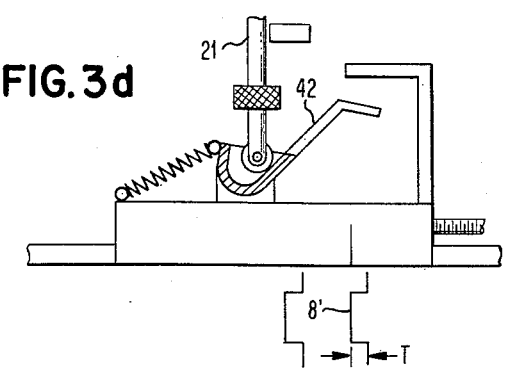

The operator stops the lateral movement of the platform 30, as shown in FIG. 3c, when the hairline is in alignment with the base fringe 7'. At this point the angle of inclination of the camming surface 42 has a slope equal to the ratio of the total upward distance traveled by the plunger 21 to the distance W between adjacent base fringes 6' and 7'. Since the total upward distance traveled by the plunger 21 corresponds to exactly one revolution of the needle 18 on the indicator dial, and since one revolution of the needle equals 2730 angstrom units (the true distance between base fringes 6' and 7'), the camming surface 42 is at the proper angle for converting any distance shown on that particular photograph into its true value in angstrom units. The operator thus tightens the clamping plates 46 against the sides of the camming member 42 to secure it in this angular position.

Figure 4A:
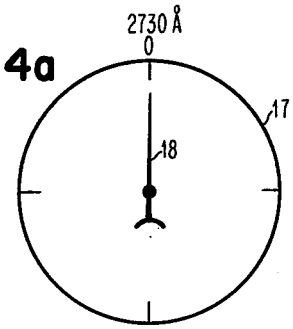
FIGS. 4a–4d are schematic diagrams showing the positions of the dial indicator of the embodiment of FIG. 1 corresponding to the four stages of operation shown in FIGS. 3a–3d.
Figure 4B:
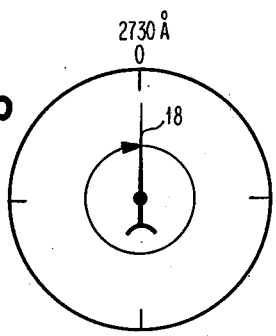
Figure 4C:
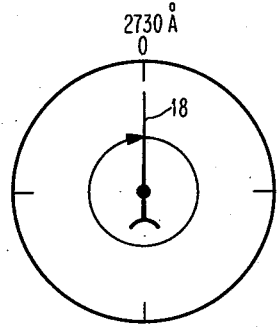
Figure 4D:
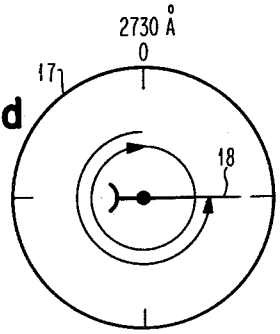

After so clamping the camming member, the operator rotates crank-wheel 32 in the reverse direction until the hairline is aligned with offset fringe 8'. As depicted in FIG. 4d the indicator needle 18 is rotated in the counterclockwise direction as the plunger 21, following the incline of camming member 42, moves downward. When the platform 30 is stopped at the point where the hairline is aligned with offset fringe 8', the dial indicator 17 gives a direct reading in angstrom units of the distance T. Thus is obtained a direct measurement of film thickness.

To prepare the apparatus for making a new measurement, either on the same photograph or on a new one, the operator loosens the knob 48 and rotates crank-wheel 32 until the needle 18 once again registers zero on the indicator dial.

In summary, the operator performs only four operations. First, he places an interferometer photograph on support surface 11 so that a base fringe is aligned with the hairline 41. Second, he rotates the crank-wheel 32 until the hairline is aligned with the next adjacent base fringe. Third, he tightens the clamping knob 48. Fourth, he turns the crank-wheel 32 in the opposite direction until the hairline is aligned with the offset fringe lying between the two base fringes. After performing these simple operations the operator reads the film thickness directly from the dial indicator. No mathematical calculations need be performed. Only one dial reading is required and only one data recordation is required—that of writing down the final result.

The apparatus is accurate to within ten angstrom units and requires only infrequent calibration checks. The adjustability of the angle of inclintion of the camming surface 42 permits the apparatus to adapt itself to the "standard" of the particular photograph under analysis, and thus photographs having different scales (degrees of enlargement) may be analyzed with equal facility. By virtue of the fact that the apparatus eliminates the necessity for making numerical calculations in determining film thicknesses from interferometer photographs and reduces the number of required scale readings to one, the possibility of operator error is virtually eliminated.

While the invention has been particularly shown and described with reference to a preferred embodiment thereof, it will be understood by those skilled in the art that various changes in form and details may be made therein without departing from the spirit and scope of the invention.

What is claimed is:

An apparatus for measuring the thickness of a thin film where said thickness is represented on an interferometer photograph by the distance between a first base fringe and an offset fringe, said offset fringe being located on said photograph between said first base fringe and a second base fringe spaced a known distance away from said first base fringe, said apparatus comprising:
 a fixed guide track;
 a platform movable along said track;
 a hairline sight mounted on said platform so that the hairline of said sight is substantially perpendicular to the path of movement of said platform;
 means for positioning said photograph beneath said hairline sight with said hairline substantially aligned with said first base fringe, said photograph thereafter being held stationary in relation to said track;
 a flat camming surface pivotally mounted on said platform so as to have its angle of inclination, measured in a plane parallel to the direction of movement of said platform, adjustable;
 indicator means mounted in a fixed position relative to said track, said indicator means including a scale and a needle movable with respect thereto, said scale being calibrated from zero in units commensurate with distances represented on said photograph;
 actuating means interconnecting said camming surface and said indicator means and including a follower arm movable in a direction perpendicular to said direction of movement of said platform, said arm being adapted to ride on said flat camming surface to move said needle relative to said scale an amount proportional to the amount of movement of said platform, said needle being initially set at the zero point on said scale when said hairline is aligned with said first base fringe;
 means for moving said platform in a forward direction to bring said hairline into substantial alignment with said second base fringe;
 detent means mounted on said follower arm;
 a stop lug mounted in a fixed position relative to said track, said lug adapted to coact with said detent means to limit the maximum displacement of said follower arm to that displacement necessary to move said needle to a point on said scale which is indicative of said known distance between said first and said second base fringes, whereby an initial portion of said movement of said platform from said first base fringe to said second base fringe causes said follower arm to move to said point of maximum displacement while the final portion of said platform movement causes said camming surface to pivot against said follower arm to a new angle of inclination with said platform, the tangent of said new angle being equal to the ratio of the distance traveled by said follower arm to the distance between said first and said second base fringes;
 clamping means coacting with said camming surface and being operable to hold said surface at said new angle of inclination; and
 means for moving said platform in a reverse direction to bring said hairline into substantial alignment with said offset fringe whereby said needle is moved toward the zero point on said scale to a point thereon indicative of the distance between said first base fringe and said offset fringe.

References Cited in the file of this patent

UNITED STATES PATENTS

| | | |
|---|---|---|
| 1,191,714 | Matthewson | July 18, 1916 |
| 2,614,327 | Russell | Oct. 21, 1952 |
| 2,840,915 | Drummond | July 1, 1958 |